US012172864B2

(12) United States Patent
Wada et al.

(10) Patent No.: US 12,172,864 B2
(45) Date of Patent: Dec. 24, 2024

(54) CENTERING MECHANISM AND PAPER SHEET HANDLING APPARATUS

(71) Applicant: FUJITSU FRONTECH LIMITED, Tokyo (JP)

(72) Inventors: Takashi Wada, Inagi (JP); Satoshi Hayashi, Inagi (JP); Tomoyuki Tamahashi, Inagi (JP); Atsushi Ando, Inagi (JP)

(73) Assignee: FUJITSU FRONTECH LIMITED, Tokyo (JP)

( * ) Notice: Subject to any disclaimer, the term of this patent is extended or adjusted under 35 U.S.C. 154(b) by 211 days.

(21) Appl. No.: 17/930,209

(22) Filed: Sep. 7, 2022

(65) Prior Publication Data

US 2022/0411214 A1 Dec. 29, 2022

Related U.S. Application Data

(63) Continuation of application No. PCT/JP2020/010577, filed on Mar. 11, 2020.

(51) Int. Cl.
*B65H 9/16* (2006.01)
*G07D 11/17* (2019.01)

(52) U.S. Cl.
CPC ............. *B65H 9/166* (2013.01); *G07D 11/17* (2019.01); *B65H 2403/40* (2013.01); (Continued)

(58) Field of Classification Search
CPC .. B65H 9/16; B65H 9/166; B65H 2404/1451; B65H 2515/34; G07D 11/17
See application file for complete search history.

(56) References Cited

U.S. PATENT DOCUMENTS 5,697,609 A * 12/1997 Williams ........... H04N 1/00718 271/251
8,348,267 B2 * 1/2013 Storey .................... B65H 9/166 271/228

(Continued)

FOREIGN PATENT DOCUMENTS

JP 07149455 A 6/1995
JP 2012086914 A 5/2012

(Continued)

OTHER PUBLICATIONS

Office action issued in corresponding Japanese patent application No. 2022-507083, dated Dec. 27, 2022.

(Continued)

*Primary Examiner* — Patrick Cicchino
(74) *Attorney, Agent, or Firm* — Greer Burns & Crain Ltd.

(57) ABSTRACT

In a centering mechanism and a paper sheet handling apparatus including the centering mechanism, a centering unit conveys a paper sheet in a pinched state, and centers a position of the paper sheet in a width direction orthogonal to a conveyance direction of the paper sheet by inclining with respect to the conveyance direction. In addition, the paper sheet is delivered to a downstream side conveyance unit from the centering unit in a state in which the centering unit pinches the paper sheet, and the downstream side conveyance unit conveys the paper sheet while pinching the paper sheet at pinch pressure stronger than pinch pressure at which the centering unit pinches the paper sheet.

3 Claims, 13 Drawing Sheets

(52) U.S. Cl.
CPC .............. *B65H 2404/14212* (2013.01); *B65H 2701/1912* (2013.01); *G07D 2211/00* (2013.01)

(56) References Cited

U.S. PATENT DOCUMENTS

| | | | | |
|---|---|---|---|---|
| 8,469,358 | B1 * | 6/2013 | Wen | B65H 9/166 271/251 |
| 8,684,353 | B2 * | 4/2014 | Miyazawa | B65H 7/02 271/273 |
| 9,139,391 | B2 * | 9/2015 | Nakamura | B65H 9/006 |
| 9,580,263 | B2 * | 2/2017 | Park | B65H 9/166 |
| 10,543,998 | B2 * | 1/2020 | Langhuber | B65H 5/38 |
| 10,584,009 | B1 * | 3/2020 | Wurmfeld | B65H 5/068 |
| 2012/0091653 | A1 | 4/2012 | Miyazawa | |
| 2016/0101958 | A1 | 4/2016 | Park et al. | |

FOREIGN PATENT DOCUMENTS

| | | | |
|---|---|---|---|
| JP | 2014069896 | A | 4/2014 |
| JP | 2015099425 | A | 5/2015 |
| JP | 2019119570 | A | 7/2019 |

OTHER PUBLICATIONS

Search report issued in corresponding European patent application No. EP 20 923 817.9, dated Nov. 9, 2023.
Written Opinion of the ISA issued in PCT/JP2020/010577, dated Jun. 2, 2020.
ISR issued in PCT/JP2020/010577, mailed Jun. 2, 2020.

* cited by examiner

CENTERING MECHANISM AND PAPER SHEET HANDLING APPARATUS

CROSS-REFERENCE TO RELATED APPLICATION

This application is continuation application of International Application PCT/JP2020/010577 filed on Mar. 11, 2020 and designated the U.S., the entire contents of which are incorporated herein by reference.

TECHNICAL FIELD

The present invention relates to a centering mechanism and a paper sheet handling apparatus.

BACKGROUND ART

There has been conventionally proposed a conveyance apparatus that inclines a conveyance roller for conveying bank bills, with respect to a conveyance direction, for aligning bank bills up against one side in a width direction orthogonal to the conveyance direction on a conveyance path of bank bills (for example, refer to Japanese Laid-open Patent Publication No. H 7-149455 A and 2015-99425 A).

SUMMARY OF INVENTION

A centering mechanism of the present disclosure includes a centering unit configured to convey a paper sheet in a pinched state, and center a position of the paper sheet in a width direction orthogonal to a conveyance direction of the paper sheet by inclining with respect to the conveyance direction, an upstream side conveyance unit that is arranged on an upstream side of the centering unit in the conveyance direction set when the centering unit centers a position of the paper sheet in the width direction, and is configured to convey the paper sheet, and a downstream side conveyance unit that is arranged on a downstream side of the centering unit in the conveyance direction set when the centering unit centers a position of the paper sheet in the width direction, and is configured to convey the paper sheet in a pinched state, in which the paper sheet is delivered to the downstream side conveyance unit from the centering unit in a state in which the centering unit pinches the paper sheet, and the downstream side conveyance unit conveys the paper sheet while pinching the paper sheet at pinch pressure stronger than pinch pressure at which the centering unit pinches the paper sheet.

Similarly, a paper sheet handling apparatus of the present disclosure includes a centering unit configured to convey a paper sheet in a pinched state, and center a position of the paper sheet in a width direction orthogonal to a conveyance direction of the paper sheet by inclining with respect to the conveyance direction, an upstream side conveyance unit that is arranged on an upstream side of the centering unit in the conveyance direction set when the centering unit centers a position of the paper sheet in the width direction, and is configured to convey the paper sheet, and a downstream side conveyance unit that is arranged on a downstream side of the centering unit in the conveyance direction set when the centering unit centers a position of the paper sheet in the width direction, and is configured to convey the paper sheet in a pinched state, in which the paper sheet is delivered to the downstream side conveyance unit from the centering unit in a state in which the centering unit pinches the paper sheet, and the downstream side conveyance unit conveys the paper sheet while pinching the paper sheet at pinch pressure stronger than pinch pressure at which the centering unit pinches the paper sheet.

The object and advantages of the present invention will be realized by the elements set forth in the claims or combinations thereof.

DESCRIPTION OF EMBODIMENTS

Meanwhile, in an automatic dealing apparatus such as an Automated Teller Machine (ATM) that handles bank bill in various sizes, if conveyed bank bills are positioned closer to one side in the width direction orthogonal to the conveyance direction, it becomes difficult to stably store the bank bills into a bank bill storage cassette or the like.

Thus, a conceivable method checks whether a bank bill is positioned closer to one side in the width direction, using a sensor, and if the bank bill is positioned closer to one side in the width direction, the method improves the slanted state by linearly moving a conveyance roller for conveying bank bills, in the width direction. The method will be described with reference to FIGS. 8A and 8B.

Figure 8A:
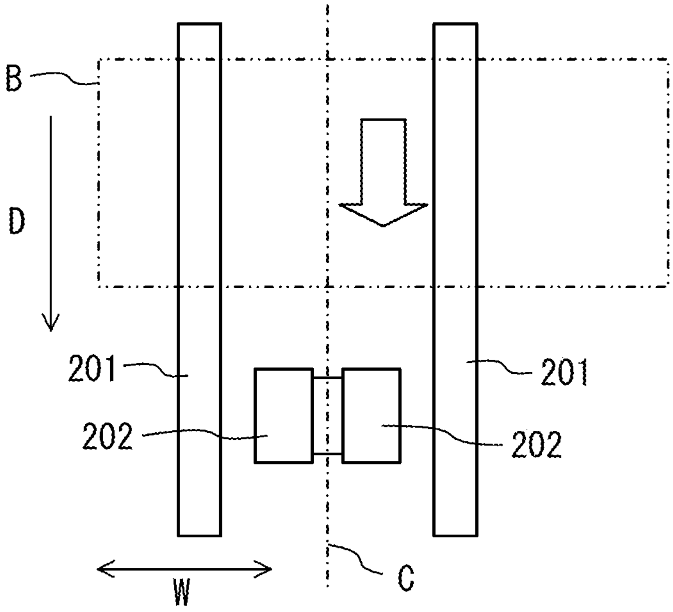
FIG. 8A is an explanatory diagram (1) for describing centering of a bank bill according to a reference art.
Figure 8B:
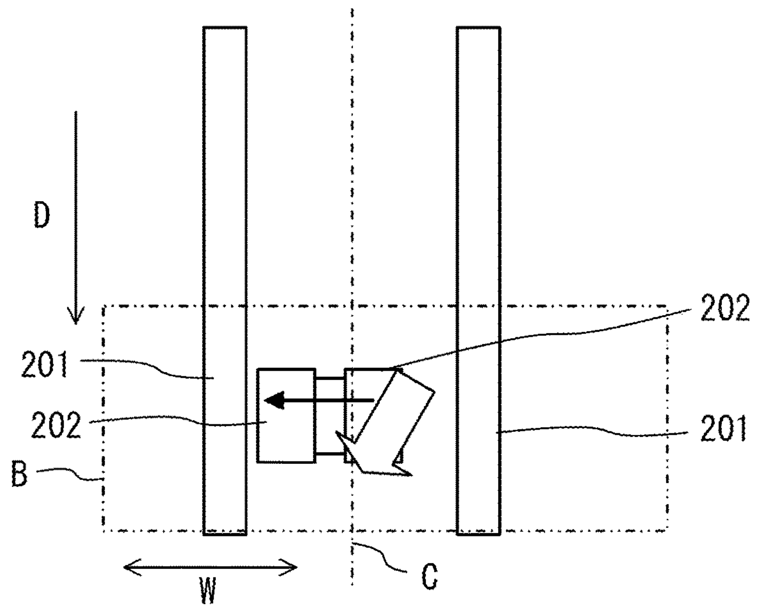
FIG. 8B is an explanatory diagram (2) for describing centering of a bank bill according to a reference art.

FIGS. 8A and 8B are explanatory diagrams for describing centering of a bank bill B in a reference art.

As illustrated in FIG. 8A, a pair of conveyance belts 201 and 201 for conveying the bank bill B in a conveyance direction D are arrayed at an interval in a width direction W orthogonal to the conveyance direction D. In addition, a pair of conveyance rollers 202 and 202 for conveying the bank bill B are arranged between the pair of conveyance belts 201 and 201 in the width direction W. Note that the pair of conveyance belts 201 and 201 are arranged over a region including an upstream side and a downstream side in the conveyance direction D of the pair of conveyance rollers 202 and 202.

In a case where the center of the bank bill B is slanted toward a right direction in FIG. 8A, over a center C of a conveyance path in the width direction W, the slanted state is detected by a sensor (not illustrated) arranged on the upstream side in the conveyance direction D of the pair of conveyance belts 201 and 201. Based on the slanted state being a detection result of the sensor, as illustrated in FIG. 8B, the pair of conveyance rollers 202 and 202 linearly move in the width direction W (toward a left direction in FIG. 8B) while conveying the bank bill B. The center of the bank bill B in the width direction W thereby gets closer to the center C.

In this manner, in a configuration of linearly moving the pair of conveyance rollers 202 and 202 in the width direction W, by the pair of conveyance rollers 202 and 202 linearly moving in the width direction W while conveying the bank bill B, skew of the bank bill B easily occurs.

In addition, the pair of conveyance belts 201 and 201 and conveyance members (not illustrated) such as conveyance rollers that face these conveyance belts 201 and 201 convey the bank bill B while pinching the bank bill B at sufficiently-low pinch pressure (conveyance force) in such a manner as not to disturb centering of the bank bill B that is performed by linearly moving the pair of conveyance rollers 202 and 202 in the width direction W.

In addition, because the pair of conveyance belts 201 and 201 are arranged over the region including the upstream side and the downstream side in the conveyance direction D of the pair of conveyance rollers 202 and 202, pinch pressure of the bank bill B becomes weak over a long range. With this configuration, retention of the bank bill B also occurs easily.

Hereinafter, a centering mechanism and a paper sheet handling apparatus according to an embodiment of the present invention will be described with reference to the drawings using a centering mechanism 1 and an automatic dealing apparatus 100 as an example.

Figure 1:
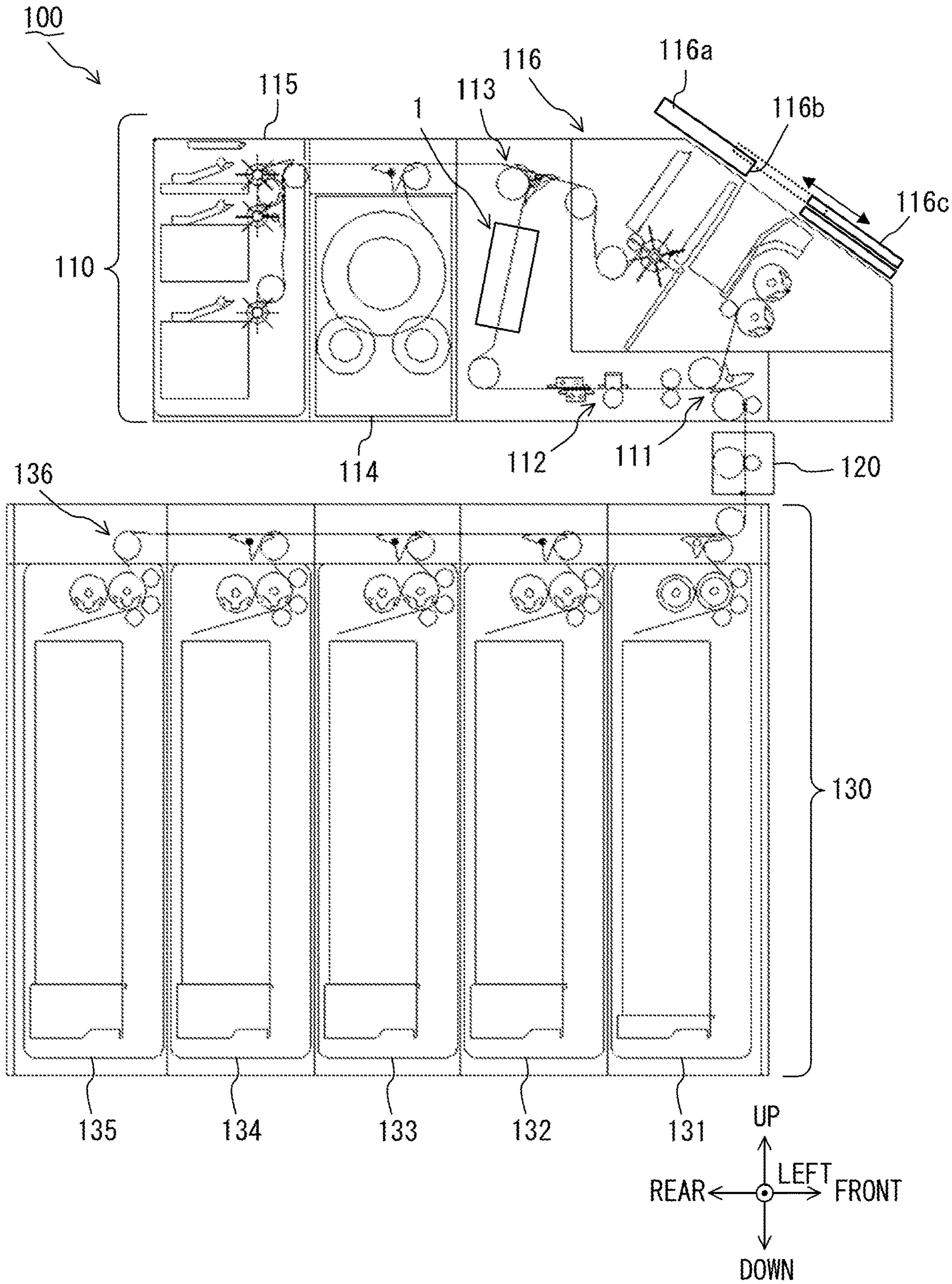
FIG. 1 is a left side view illustrating an internal configuration of an automatic dealing apparatus according to an embodiment.

FIG. 1 is a left side view illustrating an internal configuration of the automatic dealing apparatus 100.

Note that up-down, front-back, and left-right directions illustrated in FIG. 1 and FIGS. 2A to 7C to be described later merely indicate an example in a case where a client side of the automatic dealing apparatus 100 is regarded as a front direction. For example, the up-down direction corresponds to a vertical direction and the front-back and left-right directions correspond to a horizontal direction.

The automatic dealing apparatus 100 illustrated in FIG. 1 is, for example, an ATM, a Bill Recycle Unit (BRU), a Cash Dispenser (CD), a Teller Cash Recycler (TCR), or the like, and includes a main body unit 110, an intermediate conveyance unit 120, and a storage unit 130. As an example, the main body unit 110 and the storage unit 130 are arranged in different spaces via a partition (not illustrated), and the intermediate conveyance unit 120 conveys a bank bill B (refer to FIG. 2A) in such a manner as to penetrate through the above-described partition. Note that the bank bill B is an example of a paper sheet.

The main body unit 110 includes the centering mechanism 1, conveyance units 111 and 113, a determination unit 112, a temporary retention unit 114, a reject unit 115, and a bank bill deposit/withdrawal unit 116. Note that only the main body unit 110 can be regarded as a paper sheet handling apparatus.

The details of the centering mechanism 1 will be described later. The centering mechanism 1 is arranged between the determination unit 112 and the conveyance unit 113.

The conveyance unit 111 conveys the bank bill B from the bank bill deposit/withdrawal unit 116 to the determination unit 112, and also conveys the bank bill B between the determination unit 112 and the intermediate conveyance unit 120.

The determination unit 112 determines true-false, dirt, corner bending, or the like of the bank bill B. In addition, the determination unit 112 also functions as an example of a slant detection sensor for detecting that the center of the bank bill B is slanted toward either side in a width direction over the center in the width direction of a conveyance path.

The conveyance unit 113 conveys the bank bill B between the centering mechanism 1 and the temporary retention unit 114, and also conveys the bank bill B from the centering mechanism 1 to the bank bill deposit/withdrawal unit 116.

The temporary retention unit 114 temporarily stores the bank bill B that has been input to the bank bill deposit/withdrawal unit 116, and determined to be normal by the determination unit 112.

The reject unit 115 stores the bank bill B not to be returned, among the bank bills B determined to be abnormal by the determination unit 112.

The bank bill deposit/withdrawal unit 116 includes a front panel 116*a*, an inlet/outlet port 116*b*, and a shutter 116*c*.

The front panel 116*a* is arranged on an upper front surface of the automatic dealing apparatus 100 at a slant in the vertical direction and the horizontal direction in such a manner as to be positioned rearward as getting upward. The inlet/outlet port 116*b* is provided on the front panel 116*a*. The bank bill B input from the inlet/outlet port 116*b* is conveyed to the conveyance unit 111 by the bank bill deposit/withdrawal unit 116. In addition, the bank bill B conveyed from the conveyance unit 113 to the bank bill deposit/withdrawal unit 116 is conveyed by the bank bill deposit/withdrawal unit 116 up to a position at which the bank bill B is taken out from the inlet/outlet port 116*b*.

The shutter 116*c* openably blocks the inlet/outlet port 116*b*. Note that, in FIG. 1, the shutter 116*c* in an opened state is indicated by a solid line, and the shutter 116*c* in a closed state is indicated by a dotted line.

The intermediate conveyance unit 120 conveys the bank bill B between the main body unit 110 and the storage unit 130.

The storage unit 130 is arranged below the main body unit 110, and includes a plurality of bank bill storage cassettes 131, 132, 133, 134, and 135, and a storage conveyance unit 136.

The plurality of bank bill storage cassettes 131 to 135 store the bank bills B of mutually-different money types, for example. The bank bill storage cassettes 131 to 135 can discharge the stored bank bills B. Thus, the bank bills B stored in the bank bill storage cassettes 131 to 135 are used for withdrawal.

The storage conveyance unit 136 conveys the bank bill B between the intermediate conveyance unit 120 and each of the bank bill storage cassettes 131 to 135.

Figure 2A:
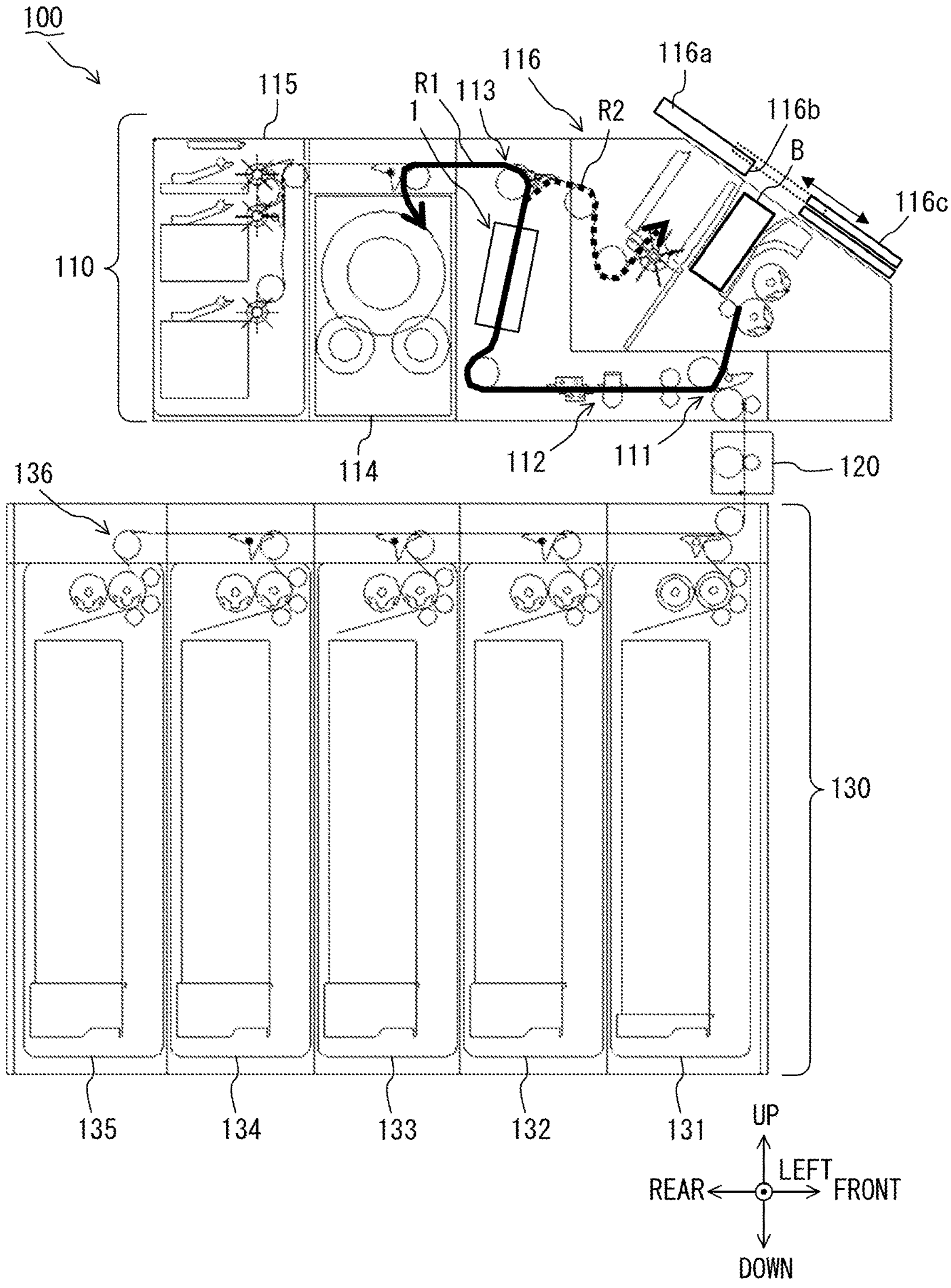
FIG. 2A is an explanatory diagram (1) for describing a conveyance path of a bank bill of an automatic dealing apparatus according to an embodiment.
Figure 2B:
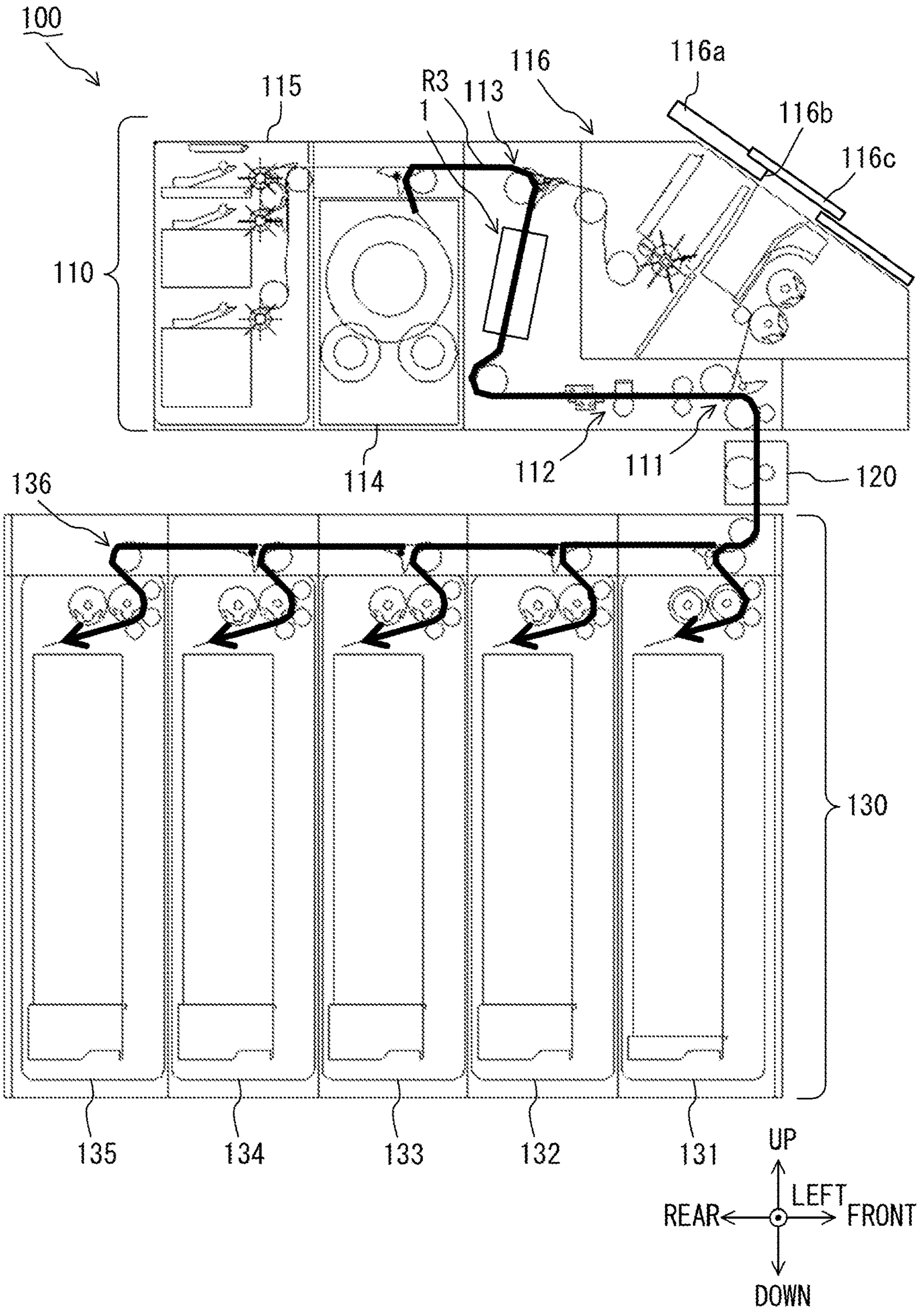
FIG. 2B is an explanatory diagram (2) for describing a conveyance path of a bank bill of an automatic dealing apparatus according to an embodiment.
Figure 2C:
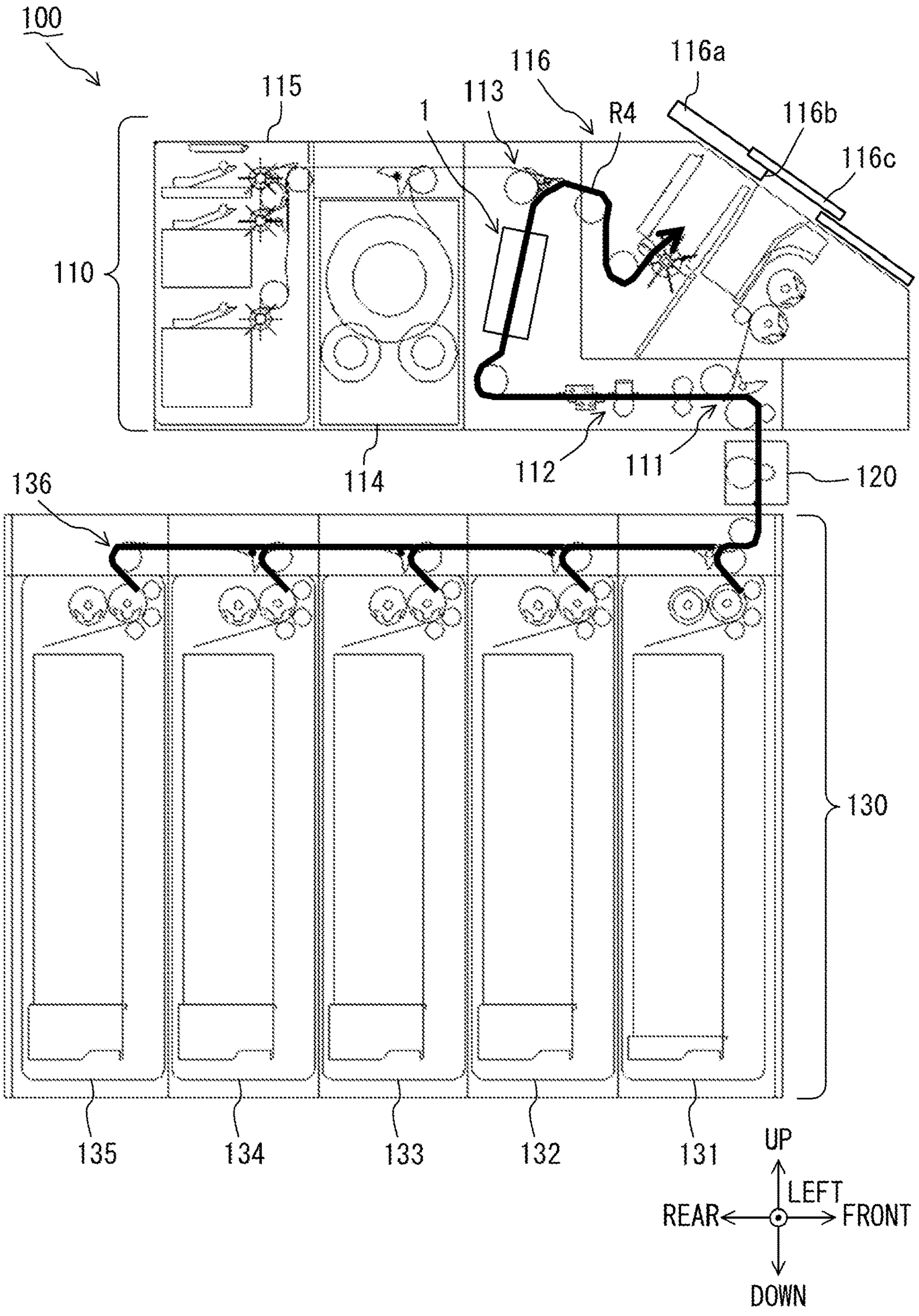
FIG. 2C is an explanatory diagram (3) for describing a conveyance path of a bank bill of an automatic dealing apparatus according to an embodiment.

FIGS. 2A to 2C are explanatory diagrams for describing conveyance paths R1 to R4 of the bank bill B of the automatic dealing apparatus 100.

First of all, as illustrated as the conveyance path R1 indicated by a thick solid arrow in FIG. 2A, the bank bill B input to the bank bill deposit/withdrawal unit 116 is conveyed to the determination unit 112 by the bank bill deposit/ withdrawal unit 116 and the conveyance unit 111. In addition, the bank bill B determined to be normal by the determination unit 112 is conveyed to the temporary retention unit 114 by the centering mechanism 1 and the conveyance unit 113.

On the other hand, as illustrated as the conveyance path R2 indicated by a thick dotted arrow in FIG. 2A, the bank bill B (bogus bill, etc.) determined to be abnormal by the determination unit 112 is returned to the bank bill deposit/withdrawal unit 116 by the conveyance unit 113.

As illustrated as the conveyance path R3 indicated by a thick solid arrow in FIG. 2B, the bank bills B temporarily stored in the temporary retention unit 114 are conveyed to the bank bill storage cassettes 131 to 135 by the conveyance unit 113, the centering mechanism 1, the determination unit 112, the conveyance unit 111, the intermediate conveyance unit 120, and the storage conveyance unit 136.

As illustrated as the conveyance path R4 indicated by a thick solid arrow in FIG. 2C, the bank bills B stored in the bank bill storage cassettes 131 to 135 are discharged to the bank bill deposit/withdrawal unit 116 at the time of withdrawal by the storage conveyance unit 136, the intermediate conveyance unit 120, the conveyance unit 111, the determination unit 112, the centering mechanism 1, and the conveyance unit 113.

Next, the centering mechanism 1 will be described.

Figure 3:
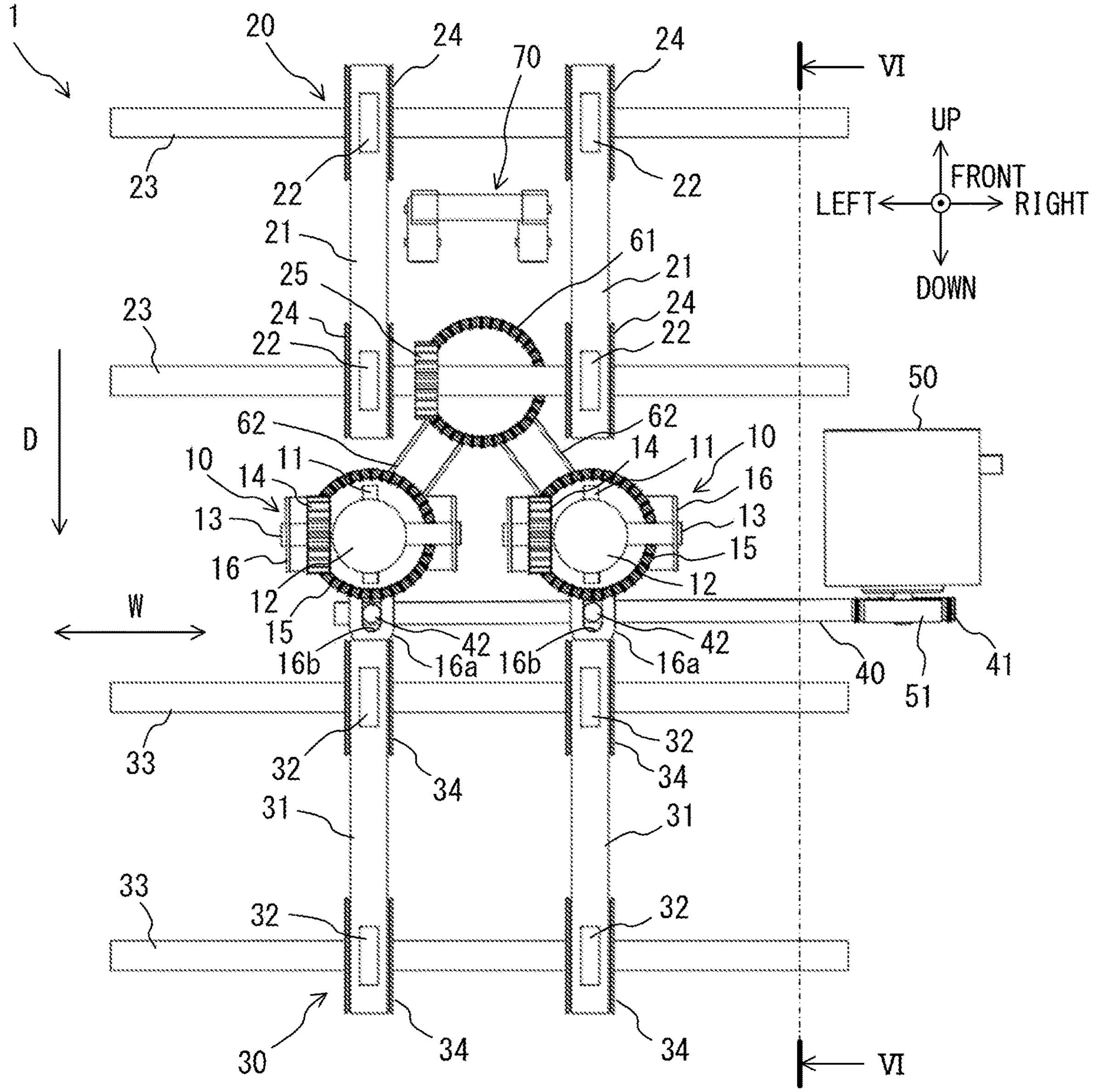
FIG. 3 is a front view illustrating a centering mechanism according to an embodiment.
Figure 4:
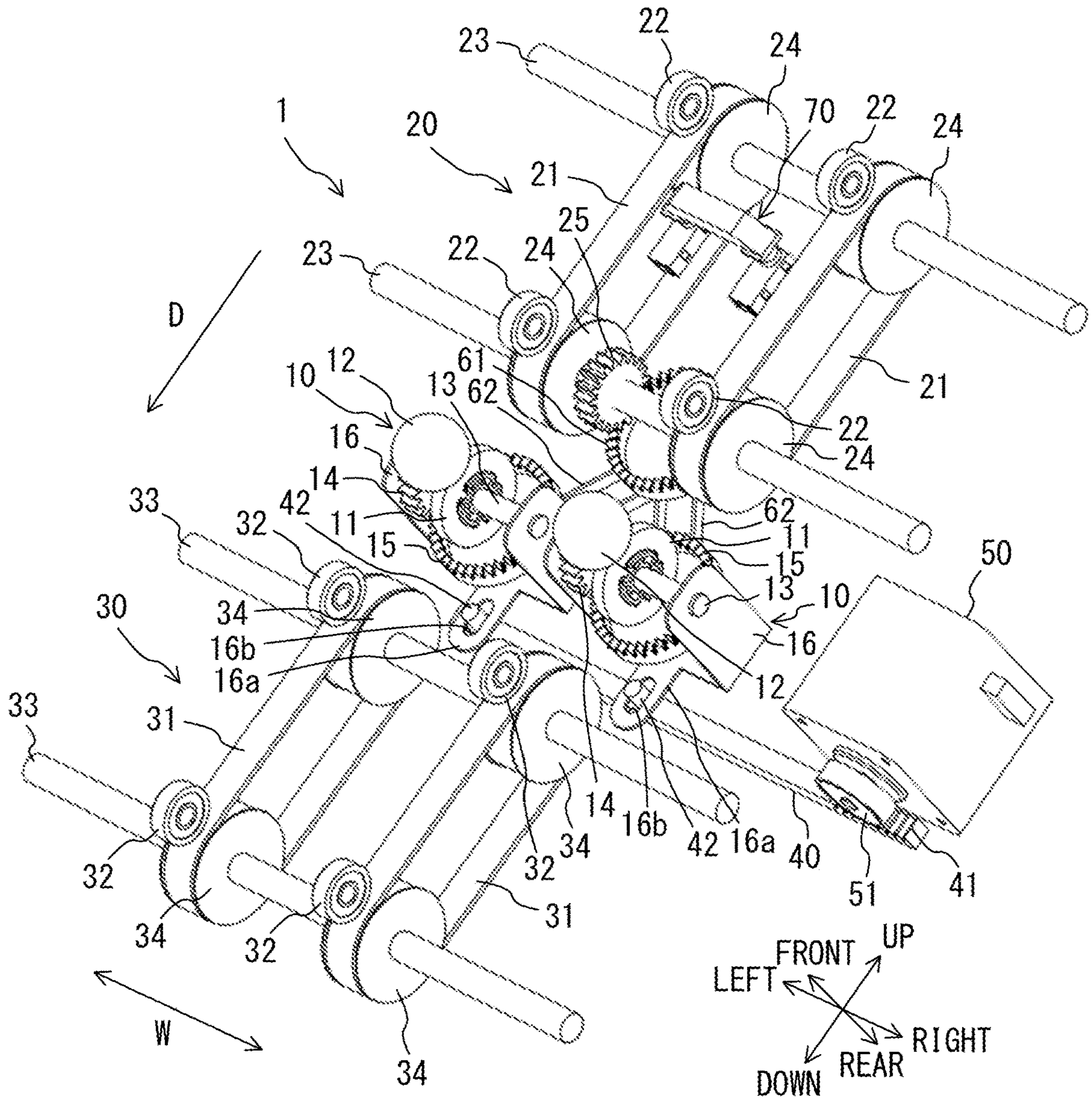
FIG. 4 is a front side perspective view illustrating a centering mechanism according to an embodiment.
Figure 5:
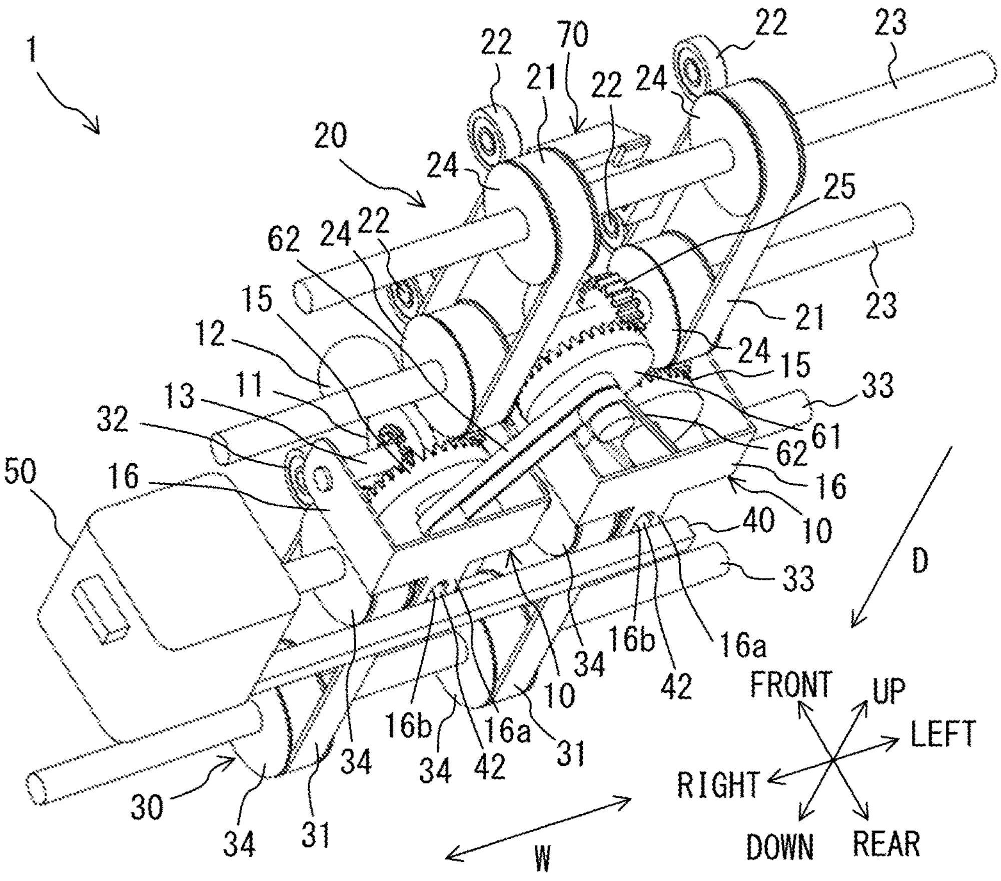
FIG. 5 is a rear side perspective view illustrating a centering mechanism according to an embodiment.
Figure 6:
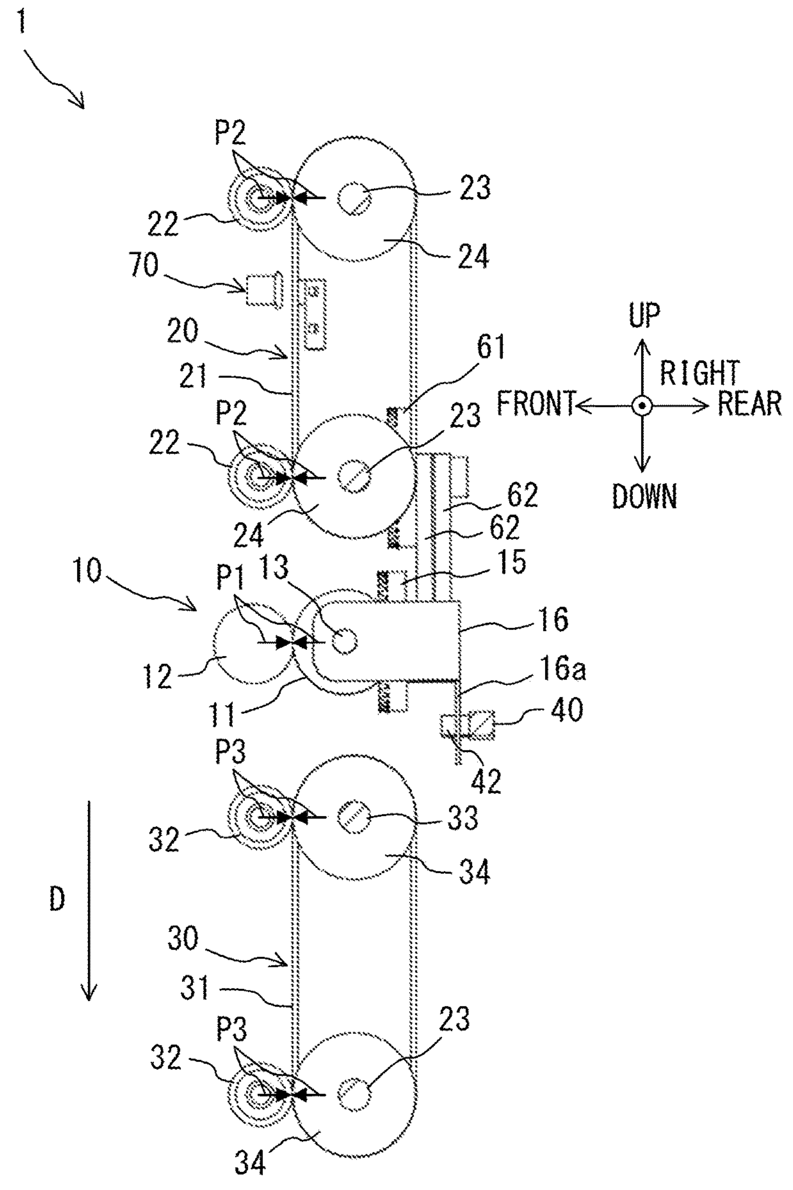
FIG. 6 is a cross-sectional view taken along a line VI-VI in FIG. 3.

FIG. 3 is a front view illustrating the centering mechanism 1. FIG. 4 is a front side perspective view illustrating the centering mechanism 1. FIG. 5 is a rear side perspective view illustrating the centering mechanism 1. FIG. 6 is a cross-sectional view taken along a line VI-VI in FIG. 3.

Here, as described above, the centering mechanism 1 conveys the bank bills B in both directions from the determination unit 112 to the conveyance unit 113 (refer to FIGS. 2A and 2C), and from the conveyance unit 113 to the determination unit 112 (refer to FIG. 2B). The description will be given assuming that FIGS. 3 to 6 and FIGS. 7A to 7C to be described later illustrate a conveyance direction D set when a centering unit 10 centers the position of the bank bill B in a width direction W orthogonal to the conveyance direction D, and a conveyance unit on an upstream side in the conveyance direction D is an upstream side conveyance unit 20 and a conveyance unit on a downstream side is a downstream side conveyance unit 30. Note that, in a case where directions in which the centering unit 10 centers the position of the bank bill B in the width direction W include both forward and backward directions of the conveyance direction D, the upstream side conveyance unit 20 functions not only as an upstream side conveyance unit but also as a downstream side conveyance unit, and the downstream side conveyance unit 30 functions not only as a downstream side conveyance unit and but also as an upstream side conveyance unit.

As illustrated in FIGS. 3 to 6, the centering mechanism 1 includes two centering units 10 and 10, the upstream side conveyance unit 20, the downstream side conveyance unit 30, an arm 40 (an example of a first power transmission unit), a drive unit 50, a crown gear 61 (an example of a fourth gear), two power transmission belts 62 and 62 (an example of second power transmission units), and an entry detection sensor 70.

The two centering units 10 and 10 are arrayed at an interval in the width direction W (left-right direction). The number of the centering units 10 may be one or plural number, but is desirably set to two. Each of the two centering units 10 and 10 conveys the bank bill B in a pinched state. In addition, the two centering units 10 and 10 center the position of the bank bill B in the width direction W by inclining with respect to the conveyance direction D (up-down direction) of the bank bill B, which will be described in detail later.

Each of the two centering units 10 and 10 includes a conveyance roller 11, a ball roller 12, a rotational shaft 13, a spur gear 14 (an example of a first gear), a crown gear 15 (an example of a second gear), and a support portion 16.

As illustrated in FIGS. 3 and 4, the conveyance roller 11 and the ball roller 12 face each other in the front-back direction, and convey the bank bill B while pinching the bank bill B at pinch pressure P1 (refer to FIG. 6). Note that the pinch pressure can be adjusted based on urging force (pressing force) of an elastic member pressing at least one of mutually-facing two conveyance members (rollers or belts) against the bank bill B. In addition, the pinch pressure can also be adjusted based on an inter-axial distance of mutually-facing two conveyance members, or tensile force of a belt (conveyance member).

The rotational shaft 13 rotates integrally with the conveyance roller 11. Note that the rotation means being rotatable in both forward and backward directions.

The spur gear 14 is provided on the rotational shaft 13.

The crown gear 15 includes teeth provided on the front side, and engages with the spur gear 14. Being driven by the drive unit 50 to be described later, the crown gear 15 rotates around a swing center (front-back direction) around which the centering unit 10 swings. By the crown gear 15 rotating based on power transmitted from the upstream side conveyance unit 20, the spur gear 14 engaging with the crown gear 15, and the rotational shaft 13 and the conveyance roller 11 that rotate together with the spur gear 14 rotate, which will be described in detail later. In other words, the conveyance roller 11 rotates based on power transmitted from the upstream side conveyance unit 20.

As illustrated in FIGS. 4 and 5, the support portion 16 has a U-shape opened toward the front side, and rotatably supports both ends of the rotational shaft 13.

As illustrated in FIGS. 3 and 4, the support portion 16 includes an extension portion 16*a* protruding downward, and an elongated hole 16*b* provided in the extension portion 16*a*. The elongated hole 16*b* is elongated in the conveyance direction D than in the width direction W, and provided in such a manner as to penetrate through the extension portion 16*a* in the front-back direction. In addition, a pin 42 of the arm 40 to be described later is inserted into the elongated hole 16*b*.

The upstream side conveyance unit 20 includes two conveyance belts 21 and 21, four conveyance rollers 22, two rotational shafts 23, four pulleys 24, and a spur gear 25 (an example of a third gear).

The two conveyance belts 21 and 21 are arrayed at an interval in the width direction W. The number of the conveyance belts 21 can be set to an arbitrary number equal to or larger than 1. Each of the two conveyance belts 21 and 21 is stretched around the two pulleys 24 and 24 to be described later.

The four conveyance rollers 22 are arranged in such a manner as to face the respective pulleys 24. The two conveyance belts 21 and the four conveyance rollers 22 face each other in the front-back direction, and convey the bank bill B while pinching the bank bill B at pinch pressure P2 (refer to FIG. 6). The pinch pressure P2 is weaker than the pinch pressure P1 generated by the conveyance roller 11 and the ball roller 12 (P2<P1). Note that the upstream side conveyance unit 20 delivers the bank bill B to the centering unit 10 in a state in which the centering unit 10 pinches the bank bill B. In other words, the upstream side conveyance unit 20 is arranged in such a manner as to neighbor the centering unit 10 at an interval shorter than the length of the bank bill B in the conveyance direction D.

The two rotational shafts 23 extend in the width direction W, and are arrayed at an interval in the conveyance direction D.

The two of the four pulleys 24 are provided on each of the rotational shafts 23, and the pulleys 24 rotate integrally with the rotational shafts 23.

The spur gear 25 is provided on a rotational shaft 23 on the centering unit 10 side (lower side), and rotates integrally with the rotational shaft 23. Note that the spur gear 25 may be provided on a rotational shaft 33 of the downstream side conveyance unit 30. In this case, the crown gear 61 and the two power transmission belts 62 and 62, which will be described later, are arranged not on the upstream side conveyance unit 20 side but on the downstream side conveyance unit 30 side.

The downstream side conveyance unit 30 includes two conveyance belts 31 and 31, four conveyance rollers 32, two rotational shafts 33, and four pulleys 34.

The two conveyance belts 31 and 31 are arrayed at an interval in the width direction W. The number of the conveyance belts 31 can be set to an arbitrary number equal to or larger than 1. Each of the two conveyance belts 31 and 31 is stretched around the two pulleys 34 and 34 to be described later.

The four conveyance rollers 32 are arranged in such a manner as to face the respective pulleys 34. The two conveyance belts 31 and the four conveyance rollers 32 face each other in the front-back direction, and convey the bank bill B while pinching the bank bill B at pinch pressure P3 (refer to FIG. 6). The pinch pressure P3 is stronger than the pinch pressure P1 generated by the conveyance roller 11 and the ball roller 12 (P3>P1). Thus, the pinch pressures P1 to P3 satisfy relationship of P3>P1>P2. Note that the bank bill B is delivered to the downstream side conveyance unit 30 from the centering unit 10 in a state in which the centering unit 10 pinches the bank bill B. In other words, the downstream side conveyance unit 30 is arranged in such a manner as to neighbor the centering unit 10 at an interval shorter than the length of the bank bill B in the conveyance direction D.

The two rotational shafts 33 extend in the width direction W, and are arrayed at an interval in the conveyance direction D.

The two of the four pulleys 34 are provided on each of the rotational shafts 33, and the pulleys 34 rotate integrally with the rotational shafts 33.

The arm 40 extends in the width direction W. Teeth 41 engaging with a spur gear 51 provided on an output shaft of the drive unit 50 to be described later are provided on the front surface of a right end (an example of one end) of the arm 40.

In addition, two pins 42 and 42 to be inserted into elongated holes 16*b* and 16*b* of two support portions 16 and 16 described above are provided on the arm 40 integrally, for example, in such a manner as to protrude forward.

The drive unit 50 is a motor, for example, that rotates the spur gear 51 provided on the output shaft extending in the conveyance direction D. By rotating the spur gear 51, the drive unit 50 moves, in the width direction W, the arm 40 including the teeth 41 engaging with the spur gear 51. The support portion 16 (the centering unit 10) including the elongated hole 16*b* into which the pin 42 of the arm 40 is to be inserted thereby swings in such a manner as to incline with respect to the conveyance direction D around a swing center corresponding to the front-back direction.

As illustrated in FIG. 5, the crown gear 61 includes teeth provided on the front side, engages with the spur gear 25 of the upstream side conveyance unit 20, and rotates around a rotational center (front-back direction) parallel to the swing center of the centering unit 10.

The two power transmission belts 62 connect the crown gear 61 and the two crown gears 15 by being stretched around a rotational shaft of the crown gear 61 and rotational shafts of the two crown gears 15.

The entry detection sensor 70 illustrated in FIGS. 3 and 4 detects the entry of the bank bill B into the centering mechanism 1. As an example, the entry detection sensor 70 includes a light emitting unit that emits detection light forward, a prism that bends detection light emitted by the light emitting unit, in the width direction W and backward, and a light receiving unit that receives detection light bent backward by the prism.

Next, centering of the bank bill B using the centering mechanism 1 will be described.

Figure 7A:
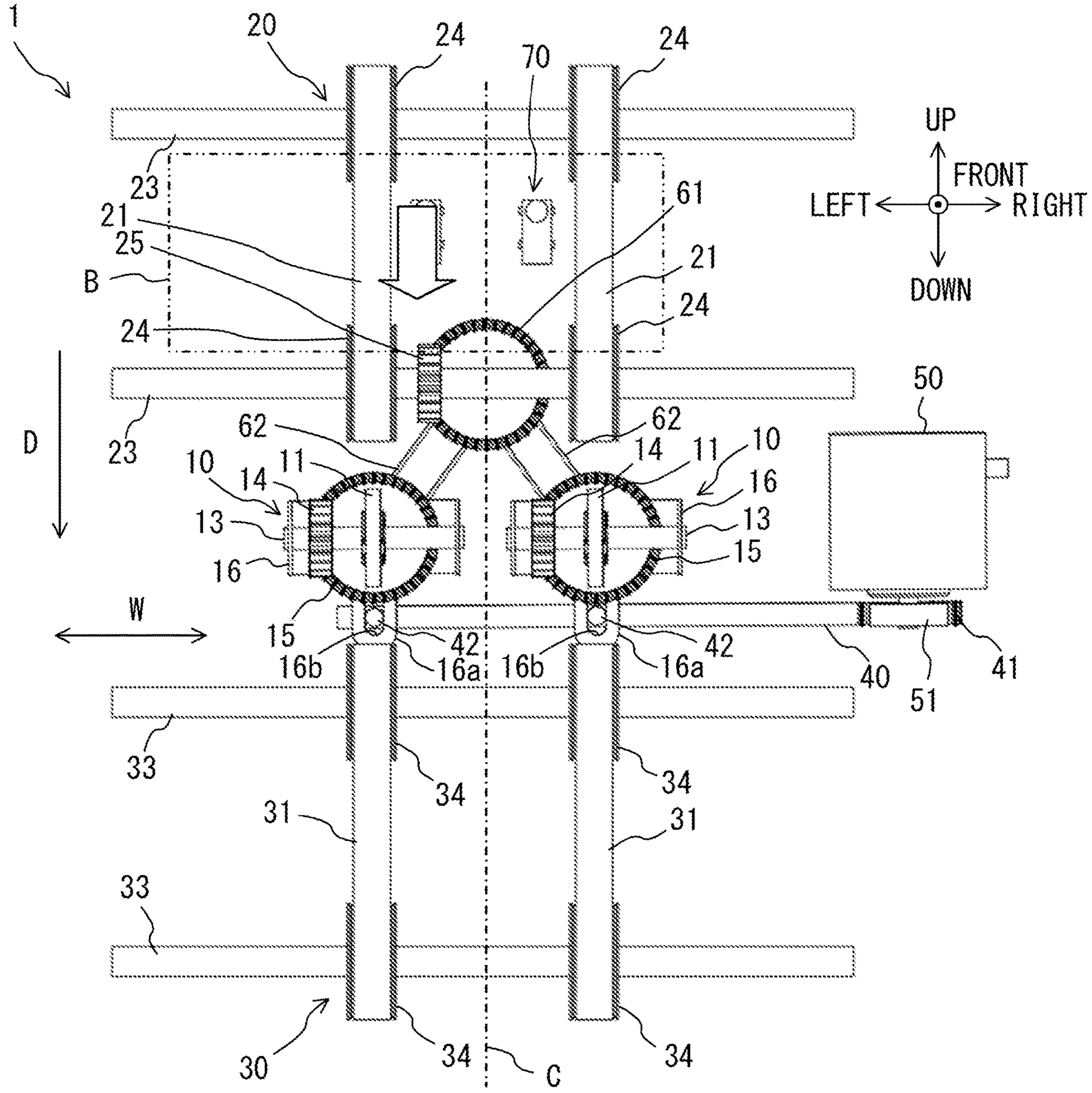
FIG. 7A is a front view (1) for describing centering of a bank bill according to an embodiment.
Figure 7B:
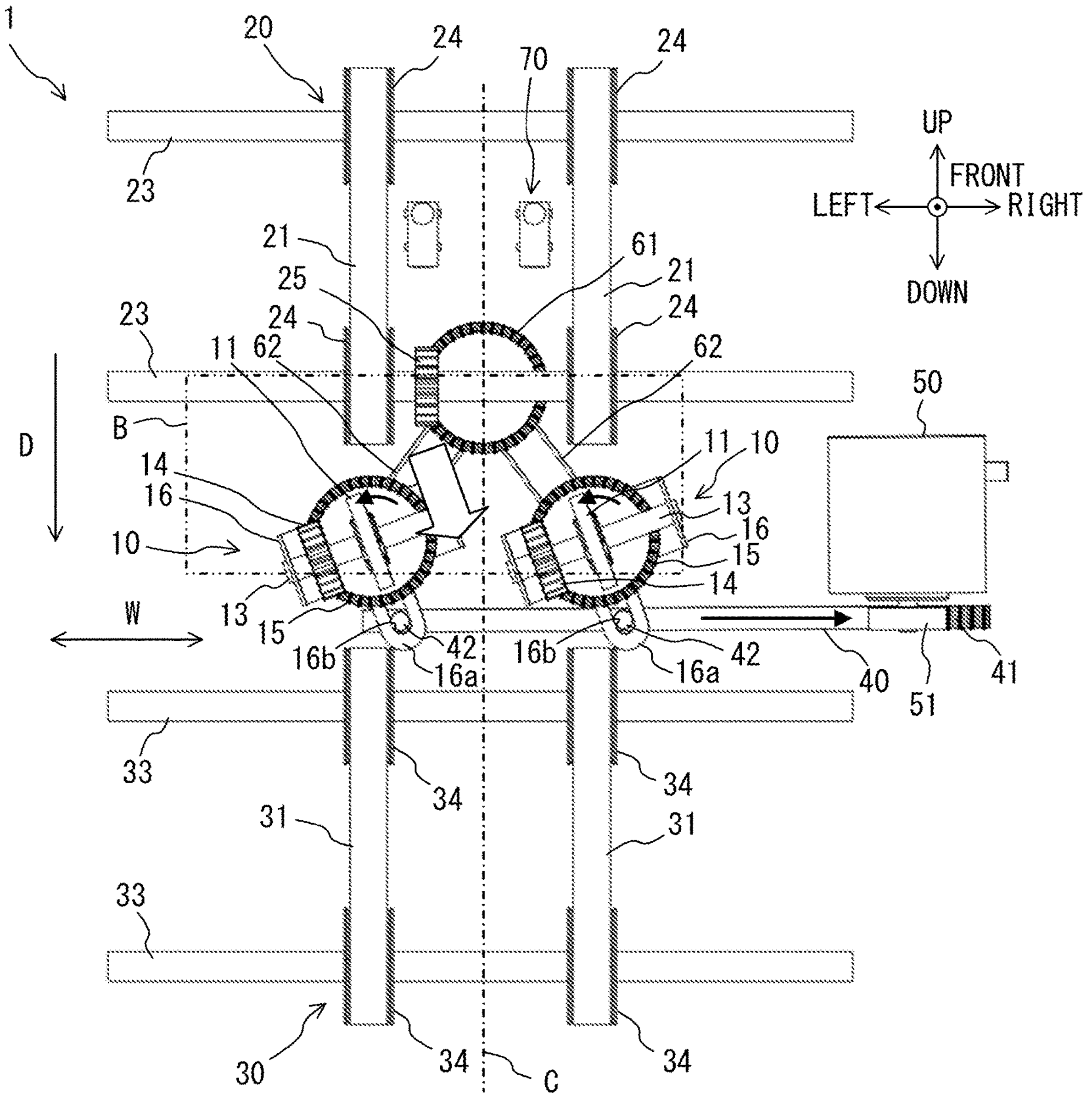
FIG. 7B is a front view (2) for describing centering of a bank bill according to an embodiment.
Figure 7C:
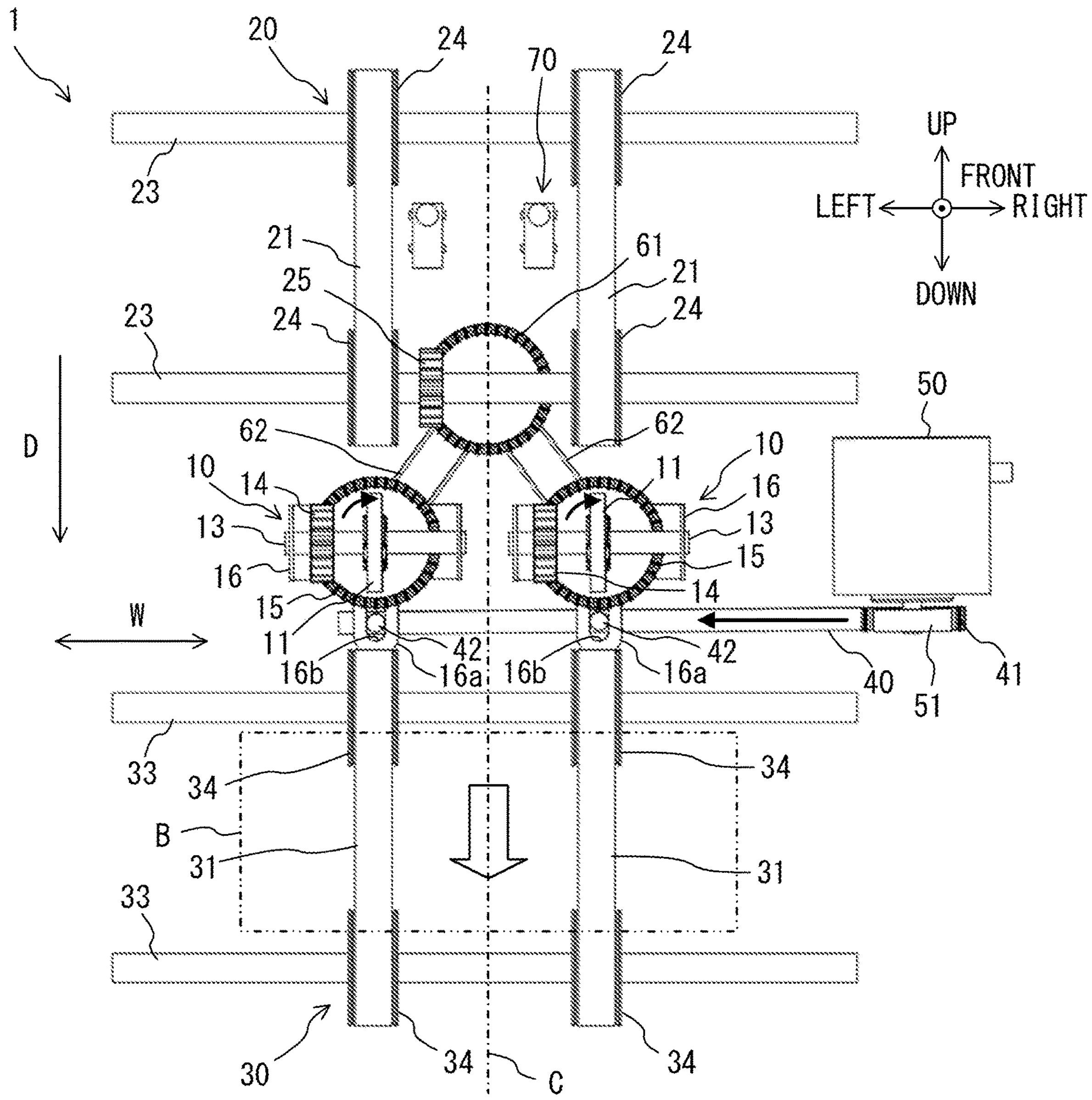
FIG. 7C is a front view (3) for describing centering of a bank bill according to an embodiment.

FIGS. 7A to 7C are front views for describing centering of the bank bill B.

Note that, in FIGS. 7A to 7C, the illustration of components (part of the ball roller 12, the four conveyance rollers 22, the four conveyance rollers 32, and the entry detection sensor 70) provided on the front side of the bank bill B is omitted.

As illustrated in FIG. 7A, first of all, the upstream side conveyance unit 20 and the downstream side conveyance unit 30 convey the bank bill B by rotating two pairs of pulleys 24 and 24, two pairs of pulleys 34 and 34, the conveyance belts 21 and 21, and the conveyance belts 31 and 31 by a drive source (not illustrated) rotating two rotational shafts 23 and 23 and two rotational shafts 33 and 33. In addition, by the spur gear 25, the crown gear 61, the two power transmission belts 62 and 62, the two crown gears 15 and 15, the two spur gears 14 and 14, and the two rotational shafts 13 and 13 rotating in accordance with the rotation of the rotational shafts 23 of the upstream side conveyance unit 20, the two conveyance rollers 11 rotate. The two centering units 10 thereby convey the bank bill B as well.

Here, as illustrated in FIG. 7A, for example, a case where the entry detection sensor 70 detects the bank bill B detected by the determination unit 112 to have a center slanted toward the left side in the width direction W over the center C of the conveyance path will be considered. Note that, as a slant detection sensor for detecting that the center of the bank bill B is slanted toward either side in the width direction W over the center C, a line sensor, an imaging unit, or the like that is arranged on an upstream side in the conveyance direction D of the centering mechanism 1 may be arranged aside from the determination unit 112.

In this case, for matching the center of the bank bill B in the width direction W with the center C of the conveyance path by moving the bank bill B toward the right side, as illustrated in FIG. 7B, the drive unit 50 rotates the spur gear 51 in such a manner as to move the arm 40 in the right direction.

With this configuration, by the two support portions 16 and 16 including the elongated holes 16*b* and 16*b* into which the two pins 42 and 42 provided on the arm 40 are to be inserted, rotating counterclockwise in FIG. 7B, the entire centering units 10 rotate counterclockwise in FIG. 7B, and incline with respect to the conveyance direction D.

Note that, as described above, because the pinch pressure P1 of the centering unit 10 is stronger than the pinch pressure P2 of the upstream side conveyance unit 20, if the centering unit 10 inclines with respect to the conveyance direction D, the bank bill B is conveyed with inclination with respect to the conveyance direction D in accordance with the inclination of the centering unit 10.

Thus, as illustrated in FIG. 7C, the bank bill B is centered in such a manner that the center in the width direction W matches the center C of the conveyance path.

The centering unit 10 that has performed centering of the bank bill B returns to the original position before the next bank bill B is conveyed. More specifically, the drive unit 50 rotates the spur gear 51 in such a manner as to move the arm 40 in the left direction, and rotates the two support portions 16 and 16 clockwise in FIG. 7C.

In the present embodiment described above, the centering mechanism 1 and the automatic dealing apparatus 100 serving as an example of a paper sheet handling apparatus including the centering mechanism 1 include the centering unit 10, the upstream side conveyance unit 20, and the downstream side conveyance unit 30. The centering unit 10 conveys the bank bill B in a pinched state, and centers the position of the bank bill B in the width direction W orthogonal to the conveyance direction D of the bank bill B by inclining with respect to the conveyance direction D. The upstream side conveyance unit 20 is arranged on the upstream side of the centering unit 10 in the conveyance direction D set when the centering unit 10 centers the position of the bank bill B in the width direction W, and conveys the bank bill B. The downstream side conveyance unit 30 is arranged on the downstream side of the centering unit 10 in the conveyance direction D set when the centering unit 10 centers the position of the bank bill B in the width direction W, and conveys the bank bill B in a pinched state In addition, the bank bill B is delivered to the downstream side conveyance unit 30 from the centering unit 10 in a state in which the centering unit 10 pinches the bank bill B, and the downstream side conveyance unit 30 conveys the bank bill B while pinching the bank bill B at the pinch pressure P3 (>pinch pressure P1) stronger than the pinch pressure at which the centering unit 10 pinches the bank bill B.

In this manner, by the centering unit 10 centering the position of the bank bill B in the width direction W while inclining with respect to the conveyance direction D, the occurrence of skew in the bank bill B can be suppressed as compared with the configuration of centering the position of the bank bill B in the width direction W by the centering unit 10 linearly moving in the width direction W.

Meanwhile, in a case where the centering unit 10 performs centering of the bank bill B by inclining with respect to the conveyance direction D, an amount of movement in the width direction of the bank bill B that is caused by centering depends on the length of the bank bill B in the conveyance direction D. Nevertheless, in the present embodiment, the bank bill B is delivered to the downstream side conveyance unit 30 from the centering unit 10 in a state in which the centering unit 10 pinches the bank bill B, and the downstream side conveyance unit 30 conveys the bank bill B while pinching the bank bill B at the pinch pressure P3 (>pinch pressure P1) stronger than the pinch pressure at which the centering unit 10 pinches the bank bill B. Thus, if the leading end of the bank bill B reaches the downstream side conveyance unit 30, the bank bill B is conveyed in the conveyance direction D irrespective of the inclination of the centering unit 10. Thus, a conveyance distance required for centering the bank bill B in the width direction W (length required for the leading end of the bank bill B reaching the downstream side conveyance unit 30 since the leading end reaches the centering unit 10) can be made constant irrespective of the length of the bank bill B in the conveyance direction D. Furthermore, by the downstream side conveyance unit 30 conveying the bank bill B while pinching the bank bill B at the pinch pressure P3 (>pinch pressure P1) stronger than that of the centering unit 10, the occurrence of retention of the bank bill B can be suppressed as compared with a configuration of using a conveyance unit that conveys the bank bill B while pinching the bank bill B at pinch pressure weaker than that of the centering unit 10 over a region including the upstream side and the downstream side in the conveyance direction D of the centering unit 10.

As described above, according to the present embodiment, centering of the bank bill B can be performed while surely conveying the bank bill B.

In addition, in the present embodiment, the bank bill B is delivered to the centering unit 10 from the upstream side conveyance unit 20 in a state in which the upstream side conveyance unit 20 pinches the bank bill B, and the centering unit 10 conveys the bank bill B while pinching the bank bill B at the pinch pressure P1 (>pinch pressure P2) stronger than the pinch pressure at which the upstream side conveyance unit 20 pinches the bank bill B.

With this configuration, as soon as the bank bill B is delivered to the centering unit 10 from the upstream side conveyance unit 20, centering of the bank bill B is performed by the inclination of the centering unit 10 with respect to the conveyance direction D. Thus, a start timing of centering of the bank bill B can be made constant. The centering of the bank bill B can be accordingly performed more accurately.

In addition, in the present embodiment, the centering mechanism 1 and the automatic dealing apparatus 100 include two (an example of plural number) centering units 10 and 10 arrayed in the width direction W, the arm 40 (an example of a first power transmission unit) that swingably supports these two centering units 10 and 10 in such a manner as to incline with respect to the conveyance direction D, and the drive unit 50 that swings the two centering units 10 and 10 by moving the arm 40 in the width direction W.

With this configuration, the two centering units 10 and 10 can accurately perform centering of the bank bill B, and centering of the bank bill B can be performed with a simple configuration.

In addition, in the present embodiment, the centering mechanism 1 and the automatic dealing apparatus 100 include two (an example of plural number) centering units 10 and 10 arrayed in the width direction W, and each of these two centering units 10 and 10 includes the conveyance roller 11, the spur gear 14 (an example of a first gear) provided on the rotational shaft 13 of the conveyance roller 11, and the crown gear 15 (an example of a second gear) that engages with the spur gear 14, and rotates around a swing center (front-back direction) around which the centering unit 10 swings in such a manner as to incline with respect to the conveyance direction D. In addition, the centering mechanism 1 and the automatic dealing apparatus 100 include the spur gear 25 (an example of a third gear) provided on the rotational shaft 23 of the upstream side conveyance unit 20 (an example of the upstream side conveyance unit 20 or the downstream side conveyance unit 30), the crown gear 61 (an example of a fourth gear) that engages with the spur gear 25, and rotates around a rotational center (front-back direction) parallel to the swing center of the centering unit 10, and the two power transmission belts 62 and 62 (an example of a plurality of second power transmission units) connected to the crown gear 61 and two (an example of plural number) crown gears 15 and 15.

With this configuration, because the rotational center of the crown gear 15 remains constant even if the centering unit 10 swings, the two crown gears 15 and 15 and the crown gear 61 can be stably connected. Thus, power for rotating the conveyance roller 11 can be transmitted from the upstream side conveyance unit 20 to the swinging centering unit 10 via the crown gear 61 and the two power transmission belts 62 and 62.

Note that the present invention is not limited to an original configuration of the above-described embodiment, and can be embodied by modifying components. For example, various inventions can be formed by appropriately combining a plurality of components disclosed in the present embodiment. Various modifications of the invention and applications can be made without departing from the spirit of the invention.

The invention claimed is:

1. A centering mechanism comprising:

a centering unit configured to convey a paper sheet in a pinched state, and center a position of the paper sheet in a width direction orthogonal to a conveyance direction of the paper sheet by inclining with respect to the conveyance direction;

an upstream side conveyance unit that is arranged on an upstream side of the centering unit in the conveyance direction set when the centering unit centers a position of the paper sheet in the width direction, and is configured to convey the paper sheet; and a downstream side conveyance unit that is arranged on a downstream side of the centering unit in the conveyance direction set when the centering unit centers a position of the paper sheet in the width direction, and is configured to convey the paper sheet in a pinched state, wherein the paper sheet is delivered to the downstream side conveyance unit from the centering unit in a state in which the centering unit pinches the paper sheet, and the downstream side conveyance unit conveys the paper sheet while pinching the paper sheet at pinch pressure stronger than pinch pressure at which the centering unit pinches the paper sheet, the centering mechanism comprises a plurality of the centering units arrayed in the width direction, wherein each of the plurality of centering units includes:

a conveyance roller;

a first gear provided on a rotational shaft of the conveyance roller; and a second gear configured to engage with the first gear, and rotate around a swing center around which the centering unit swings in such a manner as to incline with respect to the conveyance direction, and wherein the centering mechanism further comprises:

a third gear provided on a rotational shaft of the upstream side conveyance unit or the downstream side conveyance unit;

a fourth gear configured to engage with the third gear, and rotate around a rotational center parallel to the swing center of the centering unit; and a plurality of second power transmission units connected to the fourth gear and a plurality of the second gears.

2. The centering mechanism according to claim 1, wherein the paper sheet is delivered to the centering unit from the upstream side conveyance unit in a state in which the upstream side conveyance unit pinches the paper sheet, and the centering unit conveys the paper sheet while pinching the paper sheet at pinch pressure stronger than pinch pressure at which the upstream side conveyance unit pinches the paper sheet.

3. A paper sheet handling apparatus comprising:

a centering unit configured to convey a paper sheet in a pinched state, and center a position of the paper sheet in a width direction orthogonal to a conveyance direction of the paper sheet by inclining with respect to the conveyance direction;

an upstream side conveyance unit that is arranged on an upstream side of the centering unit in the conveyance direction set when the centering unit centers a position of the paper sheet in the width direction, and is configured to convey the paper sheet; and a downstream side conveyance unit that is arranged on a downstream side of the centering unit in the conveyance direction set when the centering unit centers a position of the paper sheet in the width direction, and is configured to convey the paper sheet in a pinched state, wherein the paper sheet is delivered to the downstream side conveyance unit from the centering unit in a state in which the centering unit pinches the paper sheet, and the downstream side conveyance unit conveys the paper sheet while pinching the paper sheet at pinch pressure stronger than pinch pressure at which the centering unit pinches the paper sheet, the paper sheet handling apparatus includes a plurality of the centering units arrayed in the width direction, wherein each of the plurality of centering units includes:

a conveyance roller;

a first gear provided on a rotational shaft of the conveyance roller; and a second gear configured to engage with the first gear, and rotate around a swing center around which the centering unit swings in such a manner as to incline with respect to the conveyance direction, and wherein the paper sheet handling apparatus further comprises:

a third gear provided on a rotational shaft of the upstream side conveyance unit or the downstream side conveyance unit;

a fourth gear configured to engage with the third gear, and rotate around a rotational center parallel to the swing center of the centering unit; and a plurality of second power transmission units connected to the fourth gear and a plurality of the second gears.

* * * * *